(12) United States Patent
Lovato

(10) Patent No.: US 7,055,269 B2
(45) Date of Patent: Jun. 6, 2006

(54) WHEELED VEHICLE PROVIDED WITH AN AXLE OSCILLATING ABOUT A LONGITUDINAL AXIS

(75) Inventor: Ivo Lovato, Tonengo Di Mazze' (IT)

(73) Assignee: CNH America LLC, New Holland, PA (US)

(*) Notice: Subject to any disclaimer, the term of this patent is extended or adjusted under 35 U.S.C. 154(b) by 196 days.

(21) Appl. No.: 10/723,515

(22) Filed: Nov. 26, 2003

(65) Prior Publication Data
US 2004/0154844 A1 Aug. 12, 2004

(30) Foreign Application Priority Data
Dec. 6, 2002 (IT) .................... TO2002A1068

(51) Int. Cl.
*E02F 3/65* (2006.01)
(52) U.S. Cl. ............... 37/417; 37/348; 180/41; 414/699; 414/700
(58) Field of Classification Search .............. 37/348, 37/417, 394; 180/395, 347, 41, 235, 24.01; 414/695, 967, 698, 699, 700
See application file for complete search history.

(56) References Cited
U.S. PATENT DOCUMENTS

| | | | | |
|---|---|---|---|---|
| 3,687,227 A | * | 8/1972 | Reuter et al. ............. | 180/41 |
| 3,937,339 A | * | 2/1976 | Geis et al. .................. | 414/697 |
| 4,082,197 A | * | 4/1978 | Stedman ..................... | 414/687 |
| 4,512,589 A | * | 4/1985 | Ambrose et al. ........ | 280/5.502 |
| 4,580,797 A | * | 4/1986 | Ericsson .................. | 280/5.508 |
| 4,669,566 A | * | 6/1987 | Bergius et al. ............ | 180/420 |
| 5,447,331 A | * | 9/1995 | Barnhart ................. | 280/6.157 |
| 5,513,875 A | * | 5/1996 | Tahara et al. ......... | 280/124.162 |
| 5,618,156 A | * | 4/1997 | Brown ....................... | 414/694 |
| 5,639,119 A | * | 6/1997 | Plate et al. ................ | 280/754 |
| 5,727,921 A | * | 3/1998 | Brown ....................... | 414/694 |
| 5,813,697 A | * | 9/1998 | Bargenquast et al. ...... | 280/754 |
| 6,056,501 A | * | 5/2000 | Ishikawa et al. ........... | 414/636 |
| 6,209,913 B1 | * | 4/2001 | Ishikawa et al. ........... | 280/755 |
| 6,308,973 B1 | * | 10/2001 | Griebel et al. ........ | 280/124.159 |

* cited by examiner

*Primary Examiner*—Thomas A Beach
(74) *Attorney, Agent, or Firm*—Stephen A. Bucchianeri; John William Stader; Michael C. Herms

(57) ABSTRACT

A wheeled vehicle includes a bottom chassis; a top chassis, which is coupled to the bottom chassis so that it is able to turn about a vertical axis; an operating arm coupled to the top chassis; an axle, which is coupled to the bottom chassis so that it can oscillate about a longitudinal axis of the vehicle; a plurality of wheels disposed on the axle; blocking means disposed between the bottom chassis and the axle for angularly blocking the axle about the longitudinal axis with respect to the bottom chassis; a circuit to activate the blocking means and inhibit oscillation of the axle about the longitudinal axis; and an angle sensor for supplying a signal indicative of the angular position of the operating arm about the vertical axis with respect to the bottom chassis.

12 Claims, 2 Drawing Sheets

WHEELED VEHICLE PROVIDED WITH AN AXLE OSCILLATING ABOUT A LONGITUDINAL AXIS

BACKGROUND OF THE INVENTION

1. Field of the Invention

The present invention relates to a wheeled vehicle provided with an oscillating axle, and in particular to an earth-moving vehicle.

2. Description of the Background of the Invention

Earth-moving vehicles on wheels in general comprise a bottom chassis and a top chassis, which is coupled to the bottom chassis by means of a thrust bearing for rotating about a vertical axis and is equipped with a driving cab and with an operating arm. The bottom chassis is coupled to the front wheels by means of a front axle, which is in general able to oscillate with respect to the bottom chassis about a longitudinal axis of the vehicle.

Oscillation of the front axle enables the vehicle to adapt to the irregularities of the terrain during its displacements, and can be disabled by means of a manual command issued by the driver, which blocks two hydraulic cylinders that are carried by the bottom chassis and are provided with respective rods, each of which is coupled to a corresponding axle shaft. In particular, oscillation of the axle must necessarily be disabled when the vehicle carries out operations of digging and when the rotation of the top chassis and thus of the operating arm about the vertical axis, with respect to the longitudinal axis of the vehicle, becomes greater than a comfort angle, beyond which the tilt of the vehicle becomes too great for comfortable operation.

The known solutions just described require the operator to switch the control for blocking and releasing the cylinders on the basis of his own experience, his own sensitivity, and his own promptness in identifying the rotation of the chassis.

In addition, during digging operations the driver not only has to switch blocking and release of the axle manually, but must also brake the wheels using a corresponding brake pedal, so that it is far from convenient to activate and deactivate two controls repeatedly, i.e., the one for blocking the cylinders and the one for braking, when the vehicle has to carry out various operations of digging and of displacement alternately with respect to one another, as commonly occurs on worksites where digging operations are carried out.

The purpose of the present invention is to provide a wheeled vehicle equipped with an oscillating axle, which will enable the problems outlined above to be solved in a simple and economically advantageous way.

SUMMARY OF THE INVENTION

According to an aspect of the present invention, a wheeled vehicle comprises a bottom chassis; a top chassis, which is coupled to the bottom chassis so that it is able to turn about a vertical axis; an operating arm coupled to the top chassis; an axle, which is coupled to the bottom chassis so that it can oscillate about a longitudinal axis of the vehicle; a plurality of wheels disposed on the axle; blocking means disposed between the bottom chassis and the axle for angularly blocking the axle about the longitudinal axis with respect to the bottom chassis; a circuit to activate the blocking means and inhibit oscillation of the axle about the longitudinal axis; and an angle sensor for supplying a signal indicative of the angular position of the operating arm about the vertical axis with respect to the bottom chassis.

Preferably, the circuit comprises a blocking means switch for activating the blocking means and for angularly blocking the axle according to the angular position detected by an angle sensor. The vehicle further comprises a brake sensor for detecting braking of the wheels, while the circuit comprises a braking sensor for activating the blocking means automatically and for angularly blocking the axle in the presence of braking.

BRIEF DESCRIPTION OF THE DRAWINGS

The invention will now be described with reference to the annexed drawings, which illustrate a non-limiting example of embodiment thereof and in which.

DETAILED DESCRIPTION OF THE INVENTION

Figure 1:
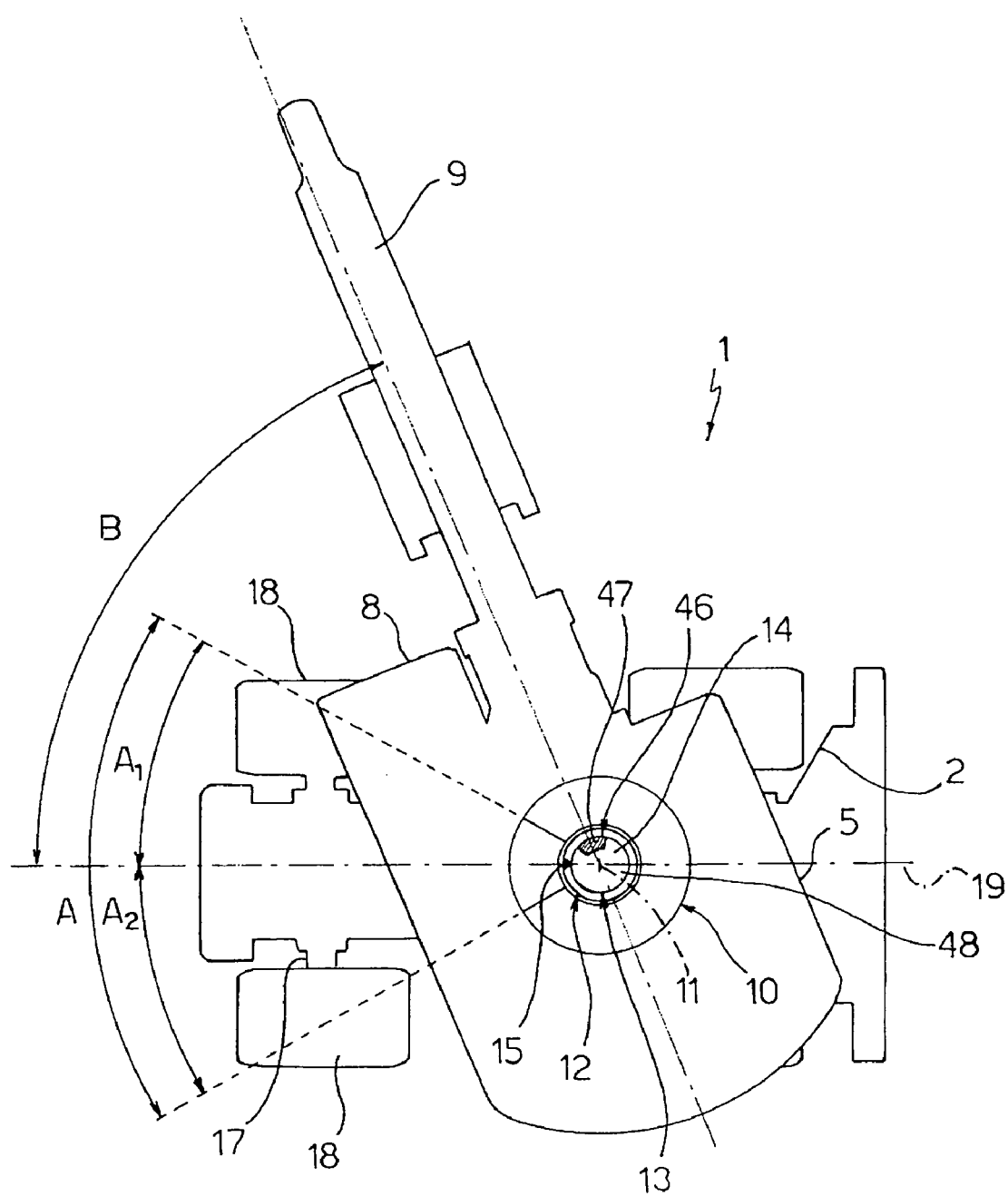
FIG. 1 is a schematic plan view of a preferred embodiment of the wheeled vehicle equipped with an oscillating axle, according to the present invention.
Figure 2:
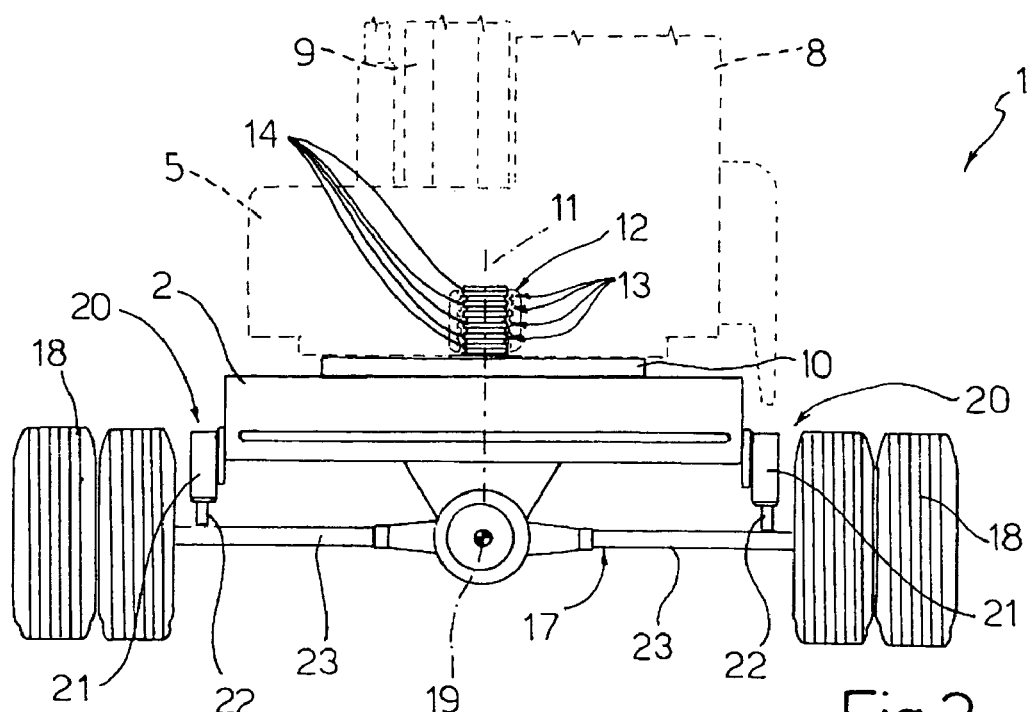
FIG. 2 is a schematic and partial front view of the vehicle of FIG. 1.

In FIGS. 1 and 2, the reference number 1 designates an earth-moving wheeled vehicle comprising a bottom chassis 2 and a top chassis 5, which is equipped with a driving cab 8 and an operating arm 9 of a known type, for example an excavating arm, which extends in cantilever fashion from the chassis 5.

The chassis 2, 5 are coupled together by means of a rotating thrust-bearing device 10 (illustrated schematically and partially in FIG. 2), which enables a relative rotation of the bottom and top chassis 2, 5 themselves about a vertical axis 11 and comprises an electrical rotating joint 12 for transmitting a plurality of electrical signals between the cab 8 and the electrical and electronic members carried by the top chassis 5 during relative rotation between the bottom and top chassis 2, 5 about the vertical axis 11. The joint 12 comprises a plurality of electrical contacts 13, which are each associated with a corresponding signal to be transmitted and consist of respective disks 14 fixed to one of the chassis 2, 5. The disks 14 are coaxial with respect to one another along the axis 11 and with respective brushes 15, which are fixed to the other of the top and bottom chassis and are disposed between the chassis 2, 5. Each of the brushes slides in electrical contact against a corresponding disk 14.

With reference to FIG. 2, the vehicle 1 further comprises a front axle 17, which carries the front wheels 18 and is coupled to the chassis 2 (in a known way and not described in detail herein) to enable oscillation about a longitudinal axis 19 parallel to a direction of advance of the vehicle 1 and hence to enable the vehicle 1 to adapt to the irregularities of the terrain during the vehicle's advance.

Oscillation of the axle 17 can be blocked by means of two hydraulic cylinders 20 of a known type, which extend in a direction transverse to the axle 17 itself and each of which comprises a corresponding liner 21 fixed to the chassis 2 and a corresponding rod 22, which can slide with respect to the liner 21 and is set resting, at its end, against a corresponding axle shaft 23 of the axle 17. The cylinders 20 define respective rear chambers (not illustrated), which communicate with one another through a pipe 24 and which contain oil, the flow of which from one cylinder 20 to the other through the pipe 24 is controlled by a hydraulic control unit 25 of a known type and schematically illustrated in FIG. 3.

The control unit 25 is carried by the chassis 2 and comprises a bistable three-way solenoid valve 26, which controls activation and deactivation of blocking of the cylinders 20 according to an excitation current S1. In particular, the solenoid valve 26 controls the oil sent by a pump 27a into a pipe 27b, from which there is picked up a pressure signal for driving two bistable valves 27c, each of which is carried by a corresponding liner 21.

When the current S1 is such as to energize the solenoid valve 26, the oil flows from the pump 27a into the pipe 27b and drives both of the valves 27c so that they open to allow oil to flow between the rear chambers of the cylinders 20 through the pipe 24, basically as if it were a closed circuit, while a valve 27d controls a flow of oil from the pipe 27b, to the pipe 24 to compensate for possible leakages of oil and to maintain the pressure of the pipe 24 at approximately 5 bar. In this operating condition, therefore, the rods 22 can translate with respect to the liners 21, and the axle 17 is thus free to oscillate about the axis 19.

When instead the current S1 is zero, the solenoid valve 26 inhibits passage of oil into the pipe 27b, so that the valves 27c, in the absence of driving, close the rear chambers of the cylinders 20. In this operating condition, therefore, the rods 22 are blocked with respect to the liners 21 on account of the counterpressure of the oil and, consequently, the axle 17 remains angularly blocked about the axis 19 with respect to the chassis 2.

Figure 3:
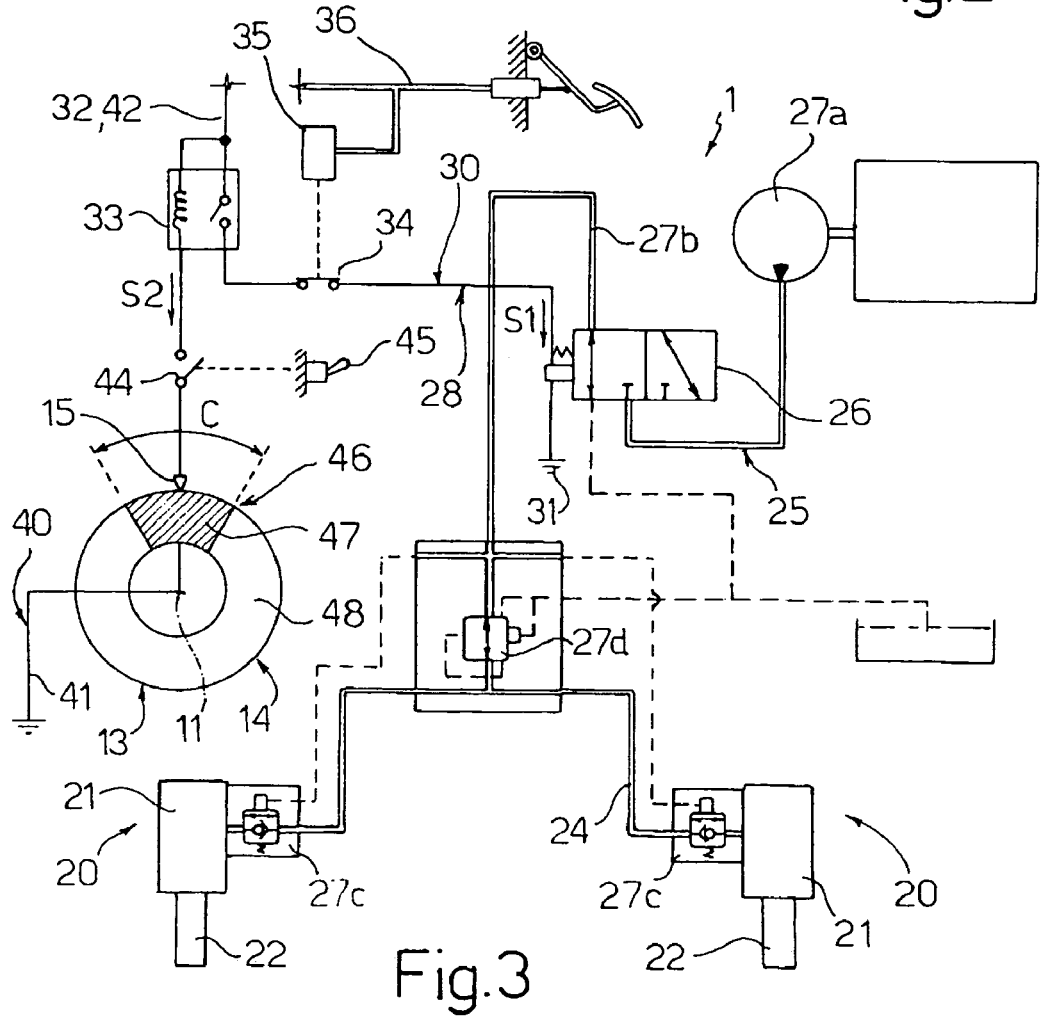
FIG. 3 is a partial electrical and hydraulic diagram of the vehicle illustrated in the preceding figures.

With reference to FIG. 3, the current S1 is generated in an electrical control circuit 28 comprising a line 30, which transmits the current S1 to the solenoid valve 26 and comprises a terminal 31 connected to ground, a voltage-supplied terminal 32, a relay 33, and a switch 34 set in series to one another.

The switch 34 is normally closed and is controlled by a pressure transducer 35 set in a hydraulic wheel-braking system 36, for automatically opening the line 30 and thus activating blocking of the cylinders 20 when the transducer 35 detects a condition of braking of the wheels.

The relay 33, instead, is normally open and may be switched by a current S2 generated in an electrical line 40 forming part of the circuit 28 and set in parallel to the line 30. The line 40 comprises a terminal 41 connected to ground, a voltage-supplied terminal 42 coinciding with the terminal 32, and a switch 44, which may be switched by the driver of the vehicle 1 by means of a manual-control member 45, for example a push-button, located in the cab 8.

The line 40 runs from the cab 8 to the chassis 5 through the joint 12 and thus comprises one of the electrical contacts 13 of the joint 12. This contact 13 comprises an angular sensor 46, which is set in series to the switch 44 and opens the line 40 when the angle B of the arm 9 about the axis 11 with respect to the axis 19 exits from a predetermined range A, which is defined by two extreme angles A1 and A2 measured on opposite sides of the axis 19 and predetermined in such a way as to prevent the cantilever position of the arm 9 from causing the vehicle 1 to turn over, when the axle 17 is free to oscillate about the axis 19 itself.

In particular, the sensor 46 comprises a conductive angular sector 47 provided on the disk 14 and having an angular amplitude C equal to the range A, while the remaining part of the disk 14, indicated by the sector 48, is not conductive.

In use, the driver manually activates the circuit 28 by closing it via the switch 44. During relative rotation of the chassis 2, 5, if the angular position of the arm 9 about the axis 11 is within the range A, the brush 15 slides in contact with the sector 47, keeps the line 40 automatically closed, and consequently enables passage, between the terminals 41, 42, of the current S2, which energizes and closes the relay 33.

In the case where the switch 34 is in a closed position, the closing of the circuit by the relay 33 enables passage between the terminals 41, 42 of the current S1, which energizes the solenoid valve 26 for maintaining the axle 17 free to oscillate about the axis 19.

When the angular position of the arm 9, instead, exits from the range A, the brush 15 comes into contact with the sector 48, and the line 40 consequently opens. On account of the absence of the current S2, the relay 33 switches to automatic opening, so that the line 30 opens, the current Si goes to zero, and hence the solenoid valve 26 switches so as to activate blocking of the cylinders 20.

When the driver operates braking of the wheels until the so-called "work brake" is engaged, the transducer 35 issues a command for switching the switch 34 to an opening position, so that the line 30 opens, the current Si goes to zero, and, also in this case, the solenoid valve 26 switches automatically to activate blocking of the cylinders 20. Once braking terminates, the switch 34 switches automatically, so closing the line 30 again.

Independently of the automatic activation and deactivation of the cylinders 20 caused by the relay 33 and by the switch 34, if the driver switches the switch 44 to the opening position, the circuit 28 remains inactive and the cylinders 20 are blocked.

From the foregoing it emerges clearly how the circuit 28 enables detection of an angular position of the arm 9 with respect to the chassis 2 and generation of a current S1 that enables control of activation or otherwise of the cylinders 20 in a precise and reliable way.

In particular, the blocking of the cylinders 20 is activated automatically by the circuit 28, so that the vehicle 1 is able to carry out digging operations in comfort, regardless of the sensitivity and degree of attention of the driver.

In addition, once the circuit 28 has been activated by closing the switch 44, the driver operates in relatively comfortable conditions during digging operations, in so far as he only needs to pay attention to braking of the vehicle 1 and does not need to switch other manual controls repeatedly for blocking and releasing the cylinders 20.

In addition, the power unit 25 operates in fail-safe conditions, in so far as in any case it keeps the cylinders 20 blocked in the absence of excitation of the solenoid valve 26.

The circuit 28 is moreover relatively simple, in that the relay 33 and the switch 34 are set in series on the same line 30 that controls the solenoid valve 26 directly. The simplicity of the circuit 28 is provided above all by the particular constructional solution of the sensor 46, which is integrated in the joint 12 and exploits the fact that the contacts 13 and disks 14 are already in earth-moving vehicles of a known type. It is necessary, as compared to known solutions, to have just one conductive sector 47 of predetermined amplitude and angular position on a disk 14 in order to obtain an electrical contact that opens the circuit automatically when the arm 9 exceeds the angles A1 and A2 and exits from the predetermined range A.

Finally, from the foregoing it emerges clearly that modifications and variations can be made to the vehicle 1 described herein with reference to the attached figures, without thereby departing from the scope of protection of the present invention.

In particular, the sensor 46 could be set directly on the line 40 and/or control directly the solenoid valve 26, in so far as, in addition to supplying a signal indicative of the angular position of the arm 9, it can define directly an electrical-activation contact that opens the circuit automatically when the arm 9 exits from the predetermined range A.

The sensor 46 could be different from the one that has been described purely by way of example, for instance it could envisage a point detection of the two angles A1 and A2 or else a precise detection of the angle of relative rotation between the chassis 2, 5. In addition, the circuit 28 that controls the power unit 25 could be different from the one that is illustrated schematically herein, and/or could be carried entirely by the chassis 5.

The invention claimed is:

1. A wheeled vehicle comprising:
    a bottom chassis:
    a top chassis, which is coupled to said bottom chassis so that it is able to turn about a vertical axis;
    an operating arm coupled to said top chassis;
    an axle, which is coupled to said bottom chassis so that it can oscillate about a longitudinal axis of the vehicle;
    a plurality of wheels disposed on said axle;
    blocking means disposed between said bottom chassis and said axle for angularly blocking said axle about said longitudinal axis with respect to said bottom chassis;
    a circuit to activate said blocking means and inhibit oscillation of said axle about said longitudinal axis; and
    an angle sensor for supplying a signal indicative of the angular position of said operating arm about said vertical axis with respect to said bottom chassis.

2. The vehicle according to claim 1, wherein said circuit comprises a blocking means switch for activating said blocking means according to said signal.

3. The vehicle according to claim 1, wherein said angle sensor comprises a first conductive element and a second conductive element, which are mobile with respect to one another according to the relative rotation between said operating arm and said bottom chassis about said vertical axis; said first and second conductive elements being set electrically in contact when the angular position of said operating arm is within a predetermined angular range with respect to said longitudinal axis.

4. The vehicle according to claim 1, further comprising a joint disposed between said top chassis and said bottom chassis and comprising said angle sensor.

5. The vehicle according to claim 4, wherein said joint comprises a set of electrical contacts, each comprising a conductive brush carried by one of said top chassis and said bottom chassis, and a disk, which is carried by the other of the top chassis and said bottom chassis and is able to turn with respect to said brush coaxially with said vertical axis; said angle sensor comprising one brush and a conductive portion of one corresponding disk.

6. The vehicle according to claim 5, wherein said conductive portion is defined by a circular sector of said disk and the remaining part of said disk being nonconductive.

7. A wheeled vehicle comprising:
    a bottom chassis;
    a top chassis which is coupled to said bottom chassis so that it is able to turn about a vertical axis;
    an operating arm coupled to said top chassis;
    an axle, which is coupled to said bottom chassis so that it can oscillate about a longitudinal axis of the vehicle;
    plurality of wheels disposed on said axle;
    blocking means disposed between said bottom chassis and said axle angularly blocking said axle about said longitudinal axis with resect to said bottom chassis;
    a circuit to activate said blocking means and inhibit oscillation of said axle about said longitudinal axis, wherein said circuit comprises a block means switch for activating said blocking means according to said signal;
    an angle sensor for supplying a signal indicative of the angular position of said operating arm about said vertical axis with respect to said bottom chassis; and
    a braking sensor for detecting braking of said wheels, wherein said circuit comprises a braking switch for activating said blocking means automatically in the presence of said braking.

8. The vehicle according to claim 7 wherein said blocking means and braking switches are set in series with respect to one another.

9. The vehicle according to claim 8, wherein said circuit comprises an electrical control circuit; said blocking means and braking switches comprise respective electrical contacts switchable so that they open said circuit and activate said blocking means.

10. The vehicle according to claim 9, wherein said blocking means switch comprises a relay switchable by said signal.

11. The vehicle according to claim 10, wherein said braking sensor comprises a pressure transducer set in a system for braking the vehicle.

12. The vehicle according to claim 11, wherein said circuit comprises a manual-control switch, which may be switched to an open position by a driver of the vehicle for opening the control circuit and activating said blocking means.

* * * * *